United States Patent
Vreys (10) Patent No.: US 11,535,748 B2
(45) Date of Patent: Dec. 27, 2022

(54) MATTE POLYCARBONATE COMPOSITIONS, ARTICLES AND METHOD TO MAKE THEM

(71) Applicant: TRINSEO EUROPE GMBH, Horgen (CH)

(72) Inventor: Mark Vreys, Oostakker (BE)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 17/761,897

(22) PCT Filed: Sep. 17, 2020

(86) PCT No.: PCT/EP2020/075957
§ 371 (c)(1),
(2) Date: Mar. 18, 2022

(87) PCT Pub. No.: WO2021/053065
PCT Pub. Date: Mar. 25, 2021

(65) Prior Publication Data
US 2022/0332944 A1    Oct. 20, 2022

Related U.S. Application Data (60) Provisional application No. 62/903,216, filed on Sep. 20, 2019.

(51) Int. Cl.
*C08L 69/00* (2006.01)
*C08K 7/16* (2006.01)
*C08L 83/04* (2006.01)
*C08K 3/34* (2006.01)

(52) U.S. Cl.
CPC ............... *C08L 69/00* (2013.01); *C08K 3/34* (2013.01); *C08K 7/16* (2013.01); *C08L 83/04* (2013.01)

(58) Field of Classification Search
CPC ..... C08L 69/00; C08G 77/045; C08K 5/5419; C08K 2003/2206
See application file for complete search history.

(56) References Cited

FOREIGN PATENT DOCUMENTS

| JP | 2014192251 | * | 10/2014 |
| WO | 2007070526 A2 | | 6/2007 |
| WO | 2016038567 A1 | | 3/2016 |
| WO | 2019043094 A1 | | 3/2019 |

OTHER PUBLICATIONS

JP 2014 192251 machine translation (2014).*
International Preliminary Report on Patentability issued in co-pending Application No. PCT/EP2020/075957 dated Dec. 20, 2021 (17 pages).
International Search Report and Written Opinion in co-pending Application No. PCT/EP2020/075957 dated Nov. 27, 2020 (11 pages).
Wallenberger, Frederick T. et al., "Glass Fibers." ASM Handbook, vol. 21: Composites (#06781G). 2001 ASM International (9 pages).

* cited by examiner

*Primary Examiner* — Kuo Liang Peng
(74) *Attorney, Agent, or Firm* — Young Basile Hanlon & MacFarlane, P.C.

(57) ABSTRACT

A polycarbonate article is described that is formed from a thermoplastic composition comprised of a polycarbonate or polycarbonate copolymer; and at least 1% by weight of a polysilsesquioxane (PSQ) solid particles that have a decomposition temperature of at least 350° C. and an acicular filler, which desirably has an aspect ratio of 2 to 50. The PSQ particles are desirably spherical. The article is formed by heating the composition and shaping the heated composition, wherein the article and the filler and PSQ particles are dispersed therein, wherein the PSQ particles desirably maintain their spherical morphology.

15 Claims, 3 Drawing Sheets

MATTE POLYCARBONATE COMPOSITIONS, ARTICLES AND METHOD TO MAKE THEM

This application is a US National Stage of PCT/EP2020/075957 which claims the benefit of U.S. Provisional Application 62/903,216 filed on Sep. 20, 2019. The entire contents of these applications are incorporated herein by reference in their entirety.

FIELD

The disclosure relates to compositions of polycarbonates and copolymers containing polycarbonates that have a matte finish. In particular, the compositions have a matte finish while retaining the desired properties of polycarbonate such as improved resistance to stress whitening.

BACKGROUND

Polycarbonate has shown excellent adaptability for a wide variety of applications. Numerous additives are known in the art for a variety of purposes, for example to provide flame retardance, to enhance impact strength, and to enhance resistance to degradation resulting from exposure to light and/or chemicals. While each of these additives has a beneficial effect, in many cases this benefit is achieved only at the expense of some other property. Thus, for any given application, careful selection of additives is necessary to achieve the properties needed for that application.

Polycarbonate and copolymers containing polycarbonate, for example, have been utilized in a wide variety applications such as eye glasses due to their good impact toughness and optical transparency. Unfilled polycarbonates form glossy surfaces useful for optical applications, but require some filler or the like to make desired properties such as lower coefficient of thermal expansion and low gloss or matte finishes for applications such as automotive parts, medical device components, electronic device components such as cell phones, and luggage. Unfortunately, when such matte finishes and aesthetics are desired in many instances the polycarbonate is subjected to repetitive stresses and it is known that filled polycarbonates have tended to experience degraded properties (see U.S. Pat. Nos. 4,243,575 and 8,871,858), which may include undesirable changes to the finish of the product after repetitive strains (e.g. stress whitening).

Thus, it would be desirable provide a polycarbonate composition having a matte finish with improved mechanical properties and, in particular, a filled polycarbonate composition having improved stress whitening behavior.

SUMMARY

The inventors have discovered that particular combinations of fillers allow for the production of low gloss filled polycarbonates without use of much overall filler, resulting in desired mechanical properties such as resistance to stress whitening. Illustratively, it has been discovered that a combination of a high aspect ratio acicular filler in combination with a highly spherical filler realizes a low gloss (matte appearance) finish.

A first aspect of the invention is a thermoplastic composition comprising a polycarbonate or polycarbonate copolymer; and at least 1% by weight of polysilsesquioxane solid particles that have a decomposition temperature of at least 350° C. and an acicular filler. In one embodiment the filler is comprised of calcium. In another embodiment, the filler is comprised of calcium and is acicular with an aspect ratio of at least 2 to 50 (e.g., wollastonite). In another embodiment, the polysilsesquioxane solid particles have a sphericity of at least 0.9 as measured by the projection from a micrograph.

A second aspect of the invention is method of forming an article comprising, (i) providing the composition of the first aspect of the invention, (ii) heating the composition of step (i) to a temperature sufficient to melt the polycarbonate or copolymer of polycarbonate but insufficient to decompose the polysilsesquioxane solid particles, and (iii) shaping the heated composition to form an article having the polysilsesquioxane solid particles and the acicular filler dispersed therein. In an embodiment of the method the polysilsesquioxane solid particles retain their shape and as such have essentially the same sphericity before and after being incorporated into the polycarbonate. Likewise, the acicular filler retains its shape too.

A third aspect of the invention is an article comprised of the composition of the first aspect of the invention.

A fourth aspect of the invention is an article comprised of polycarbonate or polycarbonate copolymer having dispersed therein a filler having an aspect ratio of at least 2 to 50 and polysilsesquioxane solid particles having a sphericity of at least 0.9 as measured by the Pentland method.

DETAILED DESCRIPTION

The composition of the invention may be in any form useful to make polycarbonate based articles such as in a dry mixture, pellitized or added separately when making an article such as added individually to a melt extruder. The mixture may be made by any known dry mixing equipment such as V-blenders or muller mixers and the like. When pellitizing the components of the composition, they may be melt extruded into any desired shape useful to subsequently make an article, for example, by injection molding or hot or cold pressing.

The composition is comprised of polycarbonate or polycarbonate copolymer (also referred to herein as "copolycarbonate"). The polycarbonate copolymer herein means a copolymer where the majority (greater than 50% by mole) of the copolymer linkages are polycarbonate units as opposed to for example ester units in a polyestercarbonate. The copolycarbonate maybe a block, branched or random copolymer. Typically the amount of carbonate units or linkages in the copolycarbonate is at least 75% or even 85% up to 99% by mole of the copolycarbonate. Comonomers may include any useful monomers that copolymerize with polycarbonate.

As used herein, "polycarbonate" means compositions having repeating structural carbonate units of the formula 1:

(1)

R1 maybe aliphatic, aromatic or combination thereof. In one embodiment, each R 1 is an aromatic organic radical, for example a radical of the formula (2):

$-A^1-Y^1-A^2-$ (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates A1 from A2. Illustrative non-limiting examples of radicals of this type are —O—, —S—, —S(O)—, —S(O$_2$)—, —C(O)—, methylene, cyclohexylmethylene,2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. Polycarbonates may be produced by the interfacial reaction of dihydroxy compounds having the formula HO—R$^1$—OH, which includes dihydroxy compounds of formula (3):

HO-A$^1$-Y$^1$-A$^2$-OH (3)

wherein $Y^1$, $A^1$, and $A^2$ are as described above. Also included are bisphenol compounds of the general formula (4):

(4)

wherein Ra and $R^b$ each represent halogen atoms or a monovalent hydrocarbon group and may be the same or different, p and q are independently integers of 0 to 4; and $X^a$ represents one of the groups of formula (5):

(5)

wherein $R^c$ and $R^d$ each independently represent a hydrogen atom or monovalent linear or cyclic hydrocarbon group and Re is a divalent hydrocarbon group having from 1 to 12 carbons.

Some illustrative examples of suitable dihydroxy compounds include the following: resorcinol, 4-bromoresorcinol, hydroquinone, 4,4'-dihydroxybiphenyl, 1, 6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-2 (3-hydroxyphenyl)propane, bis(4-hydroxyphenyl) phenylmethane, 2,2-bis(4-hydroxy-3-bromophenyl) propane, 1, 1-bis (hydroxyphenyl)cyclopentane, 1, 1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl) phthalimidine, 2-phenyl-3,3-bis-(4-hydroxyphenyl) phthalimidine (PPPBP) or any combination thereof.

Desirably the dihydroxy compound is 1,1-bis(4-hydroxyphenyl)methane, 1,1-bis(4-hydroxyphenyl)ethane, 2,2-bis (4-hydroxyphenyl)propane (hereinafter "bisphenol A" or "BPA"), 2,2-bis(4-hydroxyphenyl) butane, 2,2-bis(4-hydroxyphenyl)octane, 1,1-bis(4-hydroxyphenyl)propane, 1,1-bis(4hydroxyphenyl)n-butane, 2,2-bis(4-hydroxy-1-methylphenyl)propane, 2,2-bis(3,5-dibromo-4-hydroxyphenyl)-propane and 1,1-bis(4-hydroxy-t-butylphenyl)propane or combinations thereof. Preferably, the composition is comprised of a polycarbonate that consists essentially of carbonate units, with it being understood there may be trace amounts (e.g., less than 0.1% by mole) of other monomer units. A bisphenol A homopolycarbonate is particularly preferred as well as the polycarbonates that are mixed polycarbonates of bisphenol A that are comprised of, for example, 1% to up to 50% by mole of other desirable bisphenols such as 2,2-bis(3,5-dibromo-4-hydroxyphenyl)-propane. Likewise the polycarbonate maybe comprised of blends of at least two polycarbonates having differing chemistry or the same chemistry but differing properties such as weight average molecular weight ($M_w$) or other molecular weight averages such number average molecular weight ($M_n$) or z average molecular weight ($M_z$) or differing structures such as branched and linear.

The polycarbonates may be made by any suitable process such as those known in the art and may include interfacial polymerization or melt polymerization which are described in U.S. Pat. No. 8,871,858 from col. 7, line 37 to col. 8, line 2 and is incorporated herein by reference.

Branched polycarbonates may also be used as well as blends of linear and branched polycarbonates. Branching may be achieved by adding branching agents to the dihydroxy compounds (e.g., bisphenols) in a suitable amount. Typically, the amount is about 0.5% to 2% by mole of the dihydroxy compounds used. The branching agents has a functionality of 3 or more (e.g., 3 phenol groups). Exemplary methods for forming branched polycarbonates include those described in U.S. Pat. Nos. 3,028,365; 4,529,791; and 4,677,162; which are hereby incorporated by reference in their entirety. Exemplary branching agents that may be used are tri- or multi-functional carboxylic acid chlorides, such as trimesic acid trichloride, cyanuric acid trichloride, 3,3'-,4, 4'-benzophenonetetracarboxylic acid tetrachloride, 1,4,5,8-naphthalene-tetracarboxylic acid tetrachloride or pyromellitic acid tetrachloride for example, in amounts of about 0.01 to about 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)-benzene, 1,1,1-tris (4-hydroxyphenyl)ethane, tris(4-hydroxyphenyl)-phenylmethane, 2,2-bis[4,4-bis(4-hydroxyphenyl)cyclohexyl]-propane, 2,4-bis[1-(4-hydroxyphenyl)-1-methyl-ethyl] phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of about 0.01 to about 1.0 mole percent with respect to the diphenols used. Phenolic branching agents can be placed in the reaction vessel with the diphenols. Acid chloride branching agents can be introduced together with the acid chlorides.

The polycarbonate is typically formed using a terminating group to realize, for example, the desired molecular weight average or molecular weight distribution. Exemplary chain terminators for the production of the polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, exemplary are 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used may be about 0.1 mole percent to about 10 mole percent on the molar sum of the diphenols or dihydroxy compounds used.

Illustrative non-limiting examples of copolycarbonates include polyestercarbonates and polysiloxanecarbonates as described in U.S. Pat. Nos. 3,419,634; 6,630,525; and 8,871, 858. Exemplary ester forming monomers include dicarboxylic acid halides and hydroxycarboxylic acids. Exemplary siloxane monomers include a siloxane functional bisphenol.

The polycarbonates and/or copolycarbonates may have any useful $M_w$ to form an article therefrom. Typically, the $M_w$ ranges from 8,000, 12,000 or 16,000 to 200,000, 80,000, or 40,000. Unless otherwise indicated, the references to polycarbonate and/or co-polycarbonate "molecular weight" herein refer to weight average molecular weights ($M_w$) determined by gel permeation chromatography (GPC) using laser scattering techniques with a bisphenol A polycarbonate standard and is given in units of grams per mole (g/mole). Likewise, the melt flow rate (MFR) of the polycarbonate and/or co-polycarbonate is sufficient to allow use of the blends to prepare desired articles therefrom. Illustratively, useful melt flow rates are typically from about 2 or 3 to about 20 or 40 grams per 10 minutes (g/10 min) as determined at 300° C. under a load of 1.2 kg.

The composition may contain further additives useful in the polycarbonates. These additives are present in an amount herein based upon the weight of the polycarbonate or copolycarbonate not including the acicular filler and polysilsesquioxane solid particles. For example the polycarbonate or copolycarbonate used in the composition may contain one or more flame retardants commonly used in polycarbonate compositions. The flame retardant may be any flame retardant known to be of use in thermoplastic polymers which provide flame retardant properties. Flame retardants may be used in a sufficient amount to meet the flame retardancy requirements and in an amount that does not interfere with other properties of the article so as to render it not desirable or viable. Exemplary flame retardants include halogenated compounds, charring salt flame retardants, phosphorous containing compounds, oligomeric phosphates, poly(block-phosphonato-esters), and/or poly (block-phosphonato-carbonates) see U.S. Pat. No. 7,645,850 which is incorporated in its entirety. Preferable oligomeric phosphates include bisphenol-A bis(diphenyl phosphate) (BAPP). Preferred classes of flame retardants are halogenated flame retardants. Preferred classes of flame retardants are brominated flame retardants. Exemplary flame retardants include brominated polycarbonates, such as tetrabromobisphenol A polycarbonate oligomer, polybromophenyl ether, brominated BPA polyepoxide, brominated imides, halogenated polyacrylates, such as poly (haloaryl acryl-ate), poly (haloaryl methacrylate), brominated polystyrenes such as polydibromostyrene and polytribromostyrene, decabromobiphenyl ethane, tetrabromobiphenyl, brominated alpha, omega-alkylene-bis-phthalimides, such as. N,N'-ethylene-bis-tetrabromophthal-imide, oligomeric brominated carbonates, especially carbonates derived from tetrabromo-bisphenol A, which, if desired, are end-capped with phenoxy radicals, or with brominated phenoxy radicals, or brominated epoxy resins. Mixtures of halogenated flame retardants may be used. Exemplary preferred halogenated flame retardants include brominated polyacrylates, brominated polystyrenes and tetrabromobisphenol A polycarbonate oligomers. The flame retardants may be present in an amount of about 0.1 percent to 30 percent by weight of the polycarbonates or copolycarbonate used in the composition. Preferably the amount of the flame retardant is from 1% or 5% by to 20% or 30% by weight of the polycarbonate or copolycarbonate used in the composition.

The polycarbonate or copolycarbonate may further comprise a synergist, particularly inorganic antimony compounds. Such compounds are widely available or can be made in known ways. Typical, inorganic synergist compounds include $Sb_2O_5$, $Sb_2O_3$, sodium antimonite and the like. Especially preferred is antimony trioxide ($Sb_2O_3$). Synergists may be used at about 0.5 to about 15 by weight percent based on the weight percent of the unfilled polycarbonate or co-polycarbonate composition.

The polycarbonate or copolycarbonate thereof may further comprise a fluorinated antidrip agent. Antidrip means to reduce the tendency of the composition to form burning drips in the event of a fire. Fluorinated polyolefins known in the art as antidrip agents may be used in the compositions of the invention. Exemplary fluorinated polyolefins are described in EP-A 0 640 655. They are marketed under the brand name Teflon® 30N by DuPont. The fluorinated polyolefins may be employed both in the pure form and in the form of a coagulated mixture of emulsions of the fluorinated polyolefins with emulsions of the graft polymers or with an emulsion of a copolymer, preferably based on styrene/ acrylonitrile, the fluorinated polyolefin being mixed as an emulsion with an emulsion of the graft polymer or of the copolymer and the mixture then being coagulated. The fluorinated polyolefins may furthermore be employed as a precompound with the graft polymer (component B) or a copolymer, preferably based on styrene/acrylonitrile. The fluorinated polyolefins are mixed as powders with a powder or granules of the graft polymer or copolymer and the mixture is compounded in the melt in general at temperatures of about 200 to about 330° C. in conventional units, such as internal kneaders, extruders or twin-screw extruders. The fluorinated polyolefins may also be employed in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder, after acidic precipitation and subsequent drying. The coagulates, precompounds or masterbatches may have solids contents of fluorinated polyolefin of about 5 to about 95 weight percent, or about 7 to about 60 weight percent. The one or more anti drip agents may be present in an amount of about 0 percent by weight or greater based on the weight of the composition containing unfilled polycarbonates or copolymers thereof, about 0.05 percent by weight or greater or about 0.1 percent by weight or greater. The one or more anti drip agents may be present in an amount of about 5 percent by weight or less based on the weight of polycarbonate or copolycarbonate thereof, about 2 percent by weight or less or about 1 percent by weight or less.

The polycarbonate or copolycarbonate may further contain at least one or more additives commonly used in polycarbonates such as one or more lubricants, for example mineral oil, epoxidized soybean oil, or the like; a nucleating agent; an anti-static agent; a stabilizer; a filler other than the acicular filler and may include glass beads, mica, quartz, talc, titanium dioxide; a dye; or a pigment. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination.

The compositions disclosed may be produced by mixing the particular components in a known manner and melt-compounding and/or melt-extruding them at temperatures of from 200° C. to 350° C. in conventional units such as internal kneaders, extruders and twin-screw extruders. The individual components may be mixed in a known manner both in succession and simultaneously and both at approximately 23° C. (room temperature) and at a higher temperature.

The composition comprises 1% by weight of polysilsesquioxane ("PSQ") solid particles that have decomposition temperature of at least 350° C. and preferably are spherical and an acicular filler. The combination of the acicular filler that preferably is comprised of calcium (e.g., wollastonite) and the PSQ particles has been discovered to be essential in realizing a polycarbonate article useful in aesthetic applications undergoing repetitive strains (e.g., bending or the like) that have the desired or necessary properties of low gloss (matte finish) and acceptable stress whitening.

It has been discovered that the combination of an acicular filler and the preferably spherical polysilsesquioxane (PSQ) solid particles that have a decomposition temperature of at least 350° C. surprisingly realizes a polycarbonate with improved matte finish (low gloss) with low total loading of filler particles and reduced stress whitening. To be clear, the PSQ particles do not melt when heated. When the acicular filler is used alone it realizes the desired low gloss, but tends to accentuate stress whitening, whereas the polysilsesquioxane (PSQ) solid particles alone fail to realize the desired low gloss, but even with small additions of the PSQ particles to a polycarbonate having reduced amounts of acicular filler, the low gloss that is desired is realized and the stress whitening becomes acceptable while other desired mechanical properties are also sustained.

The total loading of the PSQ particles and acicular filler generally is from about 5% to 20% by weight of the composition. Preferably, the amount is at least about 6% or 7.5% to at most about 17.5%, 15% or even 13%. The ratio of the acicular filler/polysilsesquioxane solid particles may vary over a wide range, such as from 10 to 0.1 or 5 to 0.5. The ratio in an embodiment is desirably greater than about 1 to realize certain desired mechanical properties for certain applications, but this should not be construed in any non-limiting way.

Preferably the acicular filler has an acicular morphology wherein the aspect ratio is at least 2 to 50, wherein the acicularity means herein that the morphology may be needlelike or platy, but preferably is needlelike. Needlelike meaning that there are two smaller equivalent dimensions (typically referred to as height and width) and one larger dimensions (typically the length). Platy meaning that there are two larger somewhat equivalent dimensions (typically width and length) and one smaller dimension (typically height). More preferably the aspect ratio is at least 3, 4 or 5 to 25, 20 or 15. The average aspect ratio is determined by micrographic techniques measuring the longest and shortest dimension of a random representative sample of the particles (e.g., 100 to 200 particles). The particulate size of the acicular filler needs to be a useful size that is not too large (e.g., spans the smallest dimension of a desired article) and not too small that the desired effects on mechanical properties is not realized. In defining a useful size, the particle size and size distribution is given by the median size (D50), D10, D90 and a maximum size limitation. The size is the equivalent spherical diameter by volume as measured by a laser light scattering method (Rayleigh or Mie with Mie scattering being preferred) using dispersions of the solids in liquids at low solids loading. D10 is the size where 10% of the particles have a smaller size, D50 (median) is the size where 50% of the particles have a smaller size and D90 is the size where 90% of the particles have a smaller size by volume. Generally, The filler has an equivalent spherical diameter median (D50) particle size of 0.1 micrometer to 25 micrometers, D10 of 0.05 to 5 micrometers, D90 of 20 to 40 micrometers and essentially no particles greater than about 70 micrometers or even 50 micrometers and no particles smaller than about 0.01 micrometers. Desirably, the median is 5 to 10 micrometers, the D10 is 0.5 to 2 micrometers and the D90 is 20 to 30 micrometers.

The acicular filler, since it is not spherical and may have differing aspect ratios, it may have a greater impact on the processability of the polycarbonate due to excess surface area not directly correlated with the size as determined by light scattering methods. Consequently, the acicular filler desirably should have a specific surface area from 0.1 $m^2/g$ to 20 $m^2/g$ and preferably from 2 $m^2/g$ to 10 $m^2/g$. Likewise, the acicular filler to realize improved compatibility with the polycarbonate, desirably has an amount of alkali that is no more than about 0.5% by weight of the acicular filler. Preferably, the amount of alkali is no more than about 0.25% by weight.

In the composition of the invention, it is critical that the polysilsesquioxane solid particles remain as solid particles upon processing into articles to realize the desired stress whitening improvements desired while still achieving the necessary or desired mechanical properties. Since melt processing of polycarbonate typically is at a temperature depending on the particular polycarbonate or polycarbonate copolymer is typically from about 200° C. to 300° C., the PSQ particles need to have a decomposition temperature that exceeds that. Typically the PSQ particles has a decomposition temperature of at least about 350° C. or 400° C. and preferably at least 500° C., 600° C., or even 800° C. or more.

In addition, it is not understood, but it is also important that the PSQ particles should be spherical or nearly spherical, which may be related to how the acicular filler and PSQ particles interact within the polycarbonate article formed from the composition. Spherical or nearly spherical herein means the particle has an average projection sphericity ("sphericity" for short) that is at least 0.9 to 1. Preferably the average sphericity is at least 0.95 or even 0.98. The average sphericity is measured on a random representative sample (e.g., 100 to 200 particles) from a micrograph using image analysis of the projection of the particle based upon the following formula $(4*A)/(\pi*L^2)$, where A and L are the area and long diameter (maximum caliper) of the projection of particle, using image analysis, as described by *The Image Processing Handbook*, Sixth Ed., J. C. Russ, CRC Press, 2011 (Chapt. 11) and readily available in commercial equipment and software from suppliers such Horiba Ltd.

Polysilsesquioxane herein means a polysilsesquioxane that is comprised of silesquioxane monomer residue that realizes the desired PSQ solid particles. Silsesquioxanes are siloxanes of the formula $R(SiO_{3/2})_n$ wherein n equals an even number higher than or equal to 4, for example 4, 6, 8, etc. and R is phenyl, $C_1$-$C_8$ alkyl, cylcolalkyl, $C_1$-$C_8$ alkene or any combination thereof. The silsesquioxanes are cage-like hybrid molecules of silicon and oxygen with similarities to both silica and silicone. The $SiO_{3/2}$ units are assembled into spherical, highly symmetric cage-compounds. Terminal R units are not incorporated into the silicate framework. These structural characteristics led to the name spherosiloxanes. The spherosiloxane class of silsesquioxane shows a broad variety. Many different terminal substituents (organic and inorganic, e.g., R=alkyl, aryl, hydroxy, chlorine) are known. The $SiO_{3/2}$ unit is synthetically accessible to n in a range between about 4 to about 18 and is represented formula 6 below.

(6)

Wherein R is independently at each occurrence the same or different and is a hydrocarbon group such as a phenyl, $C_1$-$C_8$ alkyl, cylcolalkyl, $C_1$-$C_8$ alkene or any combination thereof. Preferably R is phenyl, methyl, ethyl or vinyl or combination thereof. The polysilsesquioxane is either of such a molecular weight or crosslinked or formed into a 3D dimensional structure such that it displays the properties described above. Suitable PSQ particles are commercially available from several suppliers such as Momentive Performance Materials Inc., Albany, N.Y., Shin-etsu Chemical Co., Ltd. Japan and are referred to typically as polymethylsilsesquioxane. A particular preferred PSQ particle is available from Shin-etsu under the designation SR0326.

The PSQ particles have a size that is on the same order as the acicular filler median particle size as measured by the same light scatter methods or impedance change measuring methods (such a Coulter Counter Multisizer II), but desirably have a narrower distribution. Even though one PSQ particle may be used, more than one PSQ particle may be used that has a differing size and distribution, for example to have a bimodal or multimodal distribution of PSQ particles. Typically, the median particle (D50) size is between 0.1 to 20 micrometers and preferably between 0.5 to 15 micrometers and more preferably between 1 and 10 micrometers by volume. To reiterate, the distribution of the PSQ particles are desirably narrow unless purposely broadened by mixing two or more PSQ particles of a differing median size. Generally, the D10 and D90 are within 50% of the size of D50 and preferably are within 30% of D50 by volume with essentially no particles greater than 100% of D50 (illustratively PSQ particles having a D50 of 5 micrometers, would have no particles greater than 10 micrometers).

The composition may be used to form an article and, in a particular embodiment, the acicular filler is comprised of calcium (e.g., wollastonite). In performing the method, the composition is provided and the composition is heated to a temperature sufficient to melt the polycarbonate or copolycarbonate, but insufficient to decompose the PSQ particles. The processing temperature is dependent on the particular polycarbonate or copolycarbonate that is used, but generally the processing temperature will fall between 200° C. to 300° C. or 350° C. and is sufficient to melt the polycarbonate. The heating is carried out in any suitable apparatus such as those known in the art, for example, in situ in a screw extruder. The shaping of the heated composition may be any known thermoplastic forming method and include, for example, extrusion, injection molding, thin film formation, heated pressing and heated roll pressing. In an embodiment, a laminate structure is formed wherein the composition of the present invention envelopes or covers one side of a core plastic such as polycarbonate without the acicular filler or PSQ particles (e.g. unfilled polycarbonate). Such articles may be made, for example, by coextrusion methods.

In the method of the invention, the PSQ particles desirably retain the same shape and size of the PSQ particles before being heated and shaped into an article. That is the particles have essentially the same particle size, particle size distribution and sphericity within statistical error arising from for example the measuring technique, sampling errors and the like. Generally, the PSQ particles after heating and shaping will have the same shape and size within 10% of the PSQ particles prior to heating and shaping. That is to say, the particles do not react or dissolve to an extent that they are incorporated into the polycarbonate polymer (e.g., interlaced with the polycarbonate chains) and they do not deform under the heating such that the sphericity drops below 0.9.

The article formed by the method generally has a gloss of 20 or less measured according to ISO 2813 with a 60° angle of incidence wherein the article is made using a mirror finish tool. Mirror finish means a flat surface of sufficient area to be measured as per ISO 2813 at 60° angle of incidence, wherein the surface roughness is at most about 0.10 micron Ra and 0.13 RMS roughness. Preferably the gloss is at most 18, 15 or 12 to 1. The article desirably has the PSQ particles and filler comprised of calcium (e.g., wollastonite), where the filler is acicular as described previously.

In an embodiment, an article is comprised of polycarbonate or polycarbonate copolymer having dispersed therein an acicular filler having an aspect ratio of at least 2 to 50 and polysilsesquioxane solid particles having a sphericity of at least 0.9 as measured by the Pentland method. In this embodiment, it is preferred that the acicular filler is comprised of calcium, such as a calcium silicate, calcium aluminate or combination thereof. The acicular filler and PSQ particles are desirably dispersed uniformly throughout the article. Uniform means that in any randomly selected 10 cross-sections of the article the amount of filler or PSQ particles are within 10% of the concentration of any one of the cross-sections. The amount of filler may determined by known microscopic techniques evaluating the area, for example, of a polished section. Preferably, the sphericity of the PSQ particles are as described previously and the aspect ratio of the acicular filler are also as previously described for the composition.

The articles of the invention may be used for applications requiring opaque aesthetics and subject to flexing such as bending. Illustrative examples, include, but are not limited to, luggage, containers, automotive body in white components and the like.

Illustrative Embodiments

The following embodiment are provided to illustrate the invention but are not otherwise intended to limit the scope thereof. The invention encompasses and contemplates any and all combinations of the following embodiments including those encompassed in the claims.

1. A thermoplastic composition comprising a polycarbonate or polycarbonate copolymer; and at least 1% by weight of a polysilsesquioxane solid particles that have a decomposition temperature of at least 350° C. and an acicular filler.
2. The composition of Claim 1, wherein the filler is a calcium silicate, calcium aluminosilicate or mixture thereof.
3. The composition of either Claim 1 or 2, wherein the acicular filler has a median equivalent spherical diameter of 0.1 micrometer to 25 micrometers and essentially no particles greater than 70 micrometers.
4. The composition of any one of the preceding Claims, wherein the acicular filler has an aspect ratio of at least 2 to 50.
5. The composition of anyone of the preceding Claims, wherein the acicular filler has an aspect ratio of at least 5 to 25.
6. The composition of anyone of the preceding Claims, wherein the acicular filler has a specific surface area of at least 0.1 m$^2$/g to 20 m$^2$/g.
7. The composition of anyone of the preceding Claims, wherein the acicular filler has a specific surface area of at least 2 m$^2$/g to 10 m$^2$/g.
8. The composition of anyone of the preceding Claims, wherein the acicular filler has an amount of Mg and alkali that is less than 0.5% by weight.
9. The composition of Claim 8, wherein the amount of Mg and alkali is less than 0.25% by weight.
10. The composition of any one of the preceding Claims, wherein the polysilsesquioxane solid particles and acicular filler are present in the composition in an amount from 5% to 20% by weight of the composition.
11. The composition of Claim 10, wherein the amount is from 7.5% to 15% by weight of the composition.
12. The composition of any one of the preceding Claims, wherein the acicular filler and polysilsesquioxane solid particles are present in the composition at a mass ratio of filler/polysilsesquioxane solid particles of 10 to 0.1.
13. The composition of Claim 12, wherein the mass ratio is from 5 to 0.5.
14. The composition of anyone of the preceding Claims, wherein the polysilsesquioxane solid particles have a decomposition temperature of at least 400° C.
15. The composition of anyone of the preceding Claims, wherein the polysilsesquioxane is crosslinked or has a 3D structure.
16. The composition of anyone of the preceding Claims, wherein the polysilsequioxane is formed from silesquioxane that is a siloxane of the formula R(SiO$_{3/2}$)$_n$ wherein n equals an even number higher than or equal to 4 to 16 and R is independently at each occurrence aryl, C$_1$ to C$_8$ alkyl, cycloalkyl, vinyl, or combinations of the same.
17. The composition of Claim 16, wherein R phenyl, methyl, ethyl, vinyl or combination thereof.
18. The composition of Claim 17, wherein the R is phenyl, methyl, vinyl or combination thereof.
19. The composition of any one of the preceding Claims wherein the composition further comprises a stabilizing salt.
20. The composition of Claim 15, wherein the stabilizing salt is present in an amount of 0.05 to about 0.5 percent by weight of the composition.
21. The composition of Claim 19 or 20, wherein the stabilizing salt is a phosphorous based acid.
22. The composition of Claim 15, wherein the stabilizing salt is monosodiumphosphate.
23. The composition of any one of the preceding claims further comprising one or more of an antioxidant, colorant, dye, antidrip agent and impact modifier.
24. The composition of Claim 23, wherein the antioxidant is present and is present in an amount of about 200 to about 2000 parts per million by weight of the composition.
25. The composition of any one of the preceding claims wherein the polycarbonate or polycarbonate copolymer is a branched, linear or a mixture of branched and linear polycarbonate.
26. The composition of any one of the preceding Claims, wherein the polycarbonate or polycarbonate copolymer is an aromatic polycarbonate.
27. The composition of any one of the preceding Claims, wherein the polysilsesquioxane solid particles have an average sphericity of at least 0.9 as measured by image analysis on the projection of the particles from a micrograph.
28. The composition of Claim 27, wherein the average sphericity is at least 0.95.
29. The composition of any one of the preceding Claims, wherein the polysilsesquioxane solid particles have a median particle size of 1 micrometer to 20 micrometers by volume with essentially no particles greater than 70 micrometers.
30. The composition of Claim 29, wherein the median particle size is 1 to 10 micrometers and there are essentially no particles greater than 20 micrometers by volume.
31. The composition of Claim 30, wherein essentially all of the particles have a size that is within +50% of the median.
32. An article comprised of the composition of any one of the preceding Claims.
33. The article of Claim 32, wherein the article has a top or bottom gloss of 20 or less measured according to ISO 2813 with a 60° angle of incidence.
34. The article of Claim 33, wherein the top or bottom gloss is 12 or less.

35. A method of forming an article comprising,
   (i) providing a composition comprised of a polycarbonate or polycarbonate copolymer; and at least 1% by weight of a polysilsesquioxane solid particles that have a decomposition temperature of at least 350° C. and an acicular filler,
   (ii) heating the composition of step (i) to a temperature sufficient to melt the polycarbonate or copolymer of polycarbonate but insufficient to decompose the polysilsesquioxane solid particles, and
   (iii) shaping the heated composition to form an article having the polysilsesquioxane solid particles and acicular filler dispersed therein.
36. The method of Claim 35, wherein the polysilsesquioxane solid particles are not deformed or incorporated into the polycarbonate.
37. The method of either Claim 35 or 36, wherein the polysilsesquioxane solid particles have an average sphericity of at least 0.9 within the article.
38. The method of any one of Claims 31 to 37, wherein the polysilsesquioxane solid particles and acicular filler are uniformly dispersed within the article.
39. An article comprised of polycarbonate or polycarbonate copolymer having dispersed therein a filler having an aspect ratio of at least 2 to 50 and polysilsesquioxane solid particles having an average sphericity of at least 0.9.
40. The article of Claim 39, wherein the acicular filler is a calcium silicate, calcium aluminosilicate or combination thereof.
41. The article of either Claim 39 or 40, wherein filler and polysilsesquioxane solid particles are present in the composition at a mass ratio of filler/polysilsesquioxane solid particles of 10 to 0.1.
42. The article of any one of claims 39 to 40, wherein the acicular filler is wollastonite.
43. The method of any one of claims 35 to 38, wherein the acicular filler is wollastonite.
44. The composition of any one of claims 1 to 31, wherein the acicular filler is wollastonite.

EXAMPLES

The following examples are provided to illustrate the invention, but are not intended to limit the scope thereof. All parts and percentages are by weight unless otherwise indicated.

In forming the Examples two batches were melt blended and molded to form the samples for mechanical testing and assessment of the stress whitening. In the first batch (Batch 1) a polycarbonate containing wollastonite particles (NYGLOS 4W 10992, available from Imerys Performance Additives, San Jose, Calif.). was melt blended having the formulation shown in Table 1. The D50 was about 2 micrometers and the sphericity was greater than 0.9. This batch has a light violet hue from the violet dye, which facilitates the stress whitening assessment.

The second batch (Batch 2) of polycarbonate contains PSQ particles (Shinetsu SR0326, available from Shinetsu Chemical Co., Ltd., Japan) having the formulation shown in Table 2. Batch 2 had a light brownish color due to the presence of the wollastonite. The aspect ratio of the wollastonite is about 9. The D50 is about 6.5.

The formulations used to make the Comparative Examples and Examples are shown in Table 3. Comparative Example 1 is a virgin polycarbonate PC-200 available from Trinseo SA under the tradename CALIBRE PC-200. The gloss was determined on 3 mm thick plaques using a 60° incident angle using ISO 2813. The average gloss from one surface is reported where 5 measurements on different plaques were measured to arrive at the average gloss. The plaques were made by injection molding in a mirror finish tool at a melt temperature of 270° C. and tool temperature of 100° C. The injection speed was 35 mm/min and the cooling time was 25 seconds. Two millimeter thick falling dart impact plaques were made using the same conditions as just described. The falling dart impact was determined using ISO 6603-2.

The elongation at rupture, elongation at yield, tensile modulus, yield stress and rupture stress were performed on tensile samples using ISO 527. The Tensile samples were made by injection molding at a melt temperature of 320° C. and tool temperature of 100° C. The injection speed was 35 mm/min and the cooling time was 25 seconds.

The notched charpy test was performed as per ISO 179 at a temperature of 23° C. The Charpy test specimen were made by injection molding at a melt temperature of 320° C. and tool temperature of 100° C. The injection speed was 35 mm/min and the cooling time was 25 seconds.

Figure 1A:
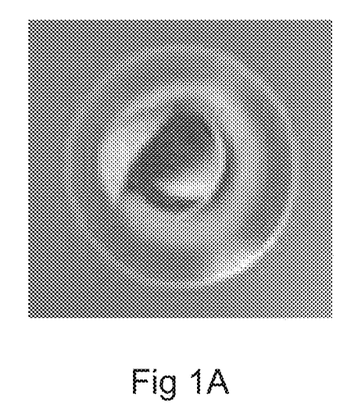
FIG. 1A is a color photograph of a falling dart sample not of this invention showing substantial stress whitening.
Figure 1B:
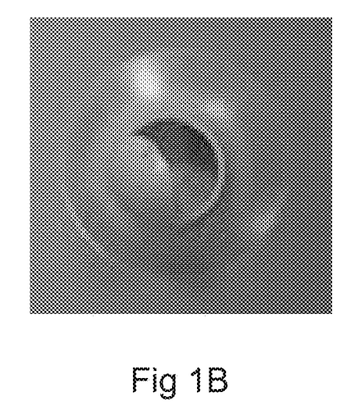
FIG. 1B is a color photograph of a falling dart sample of this invention showing substantial improvement in the stress whitening.
Figure 2:
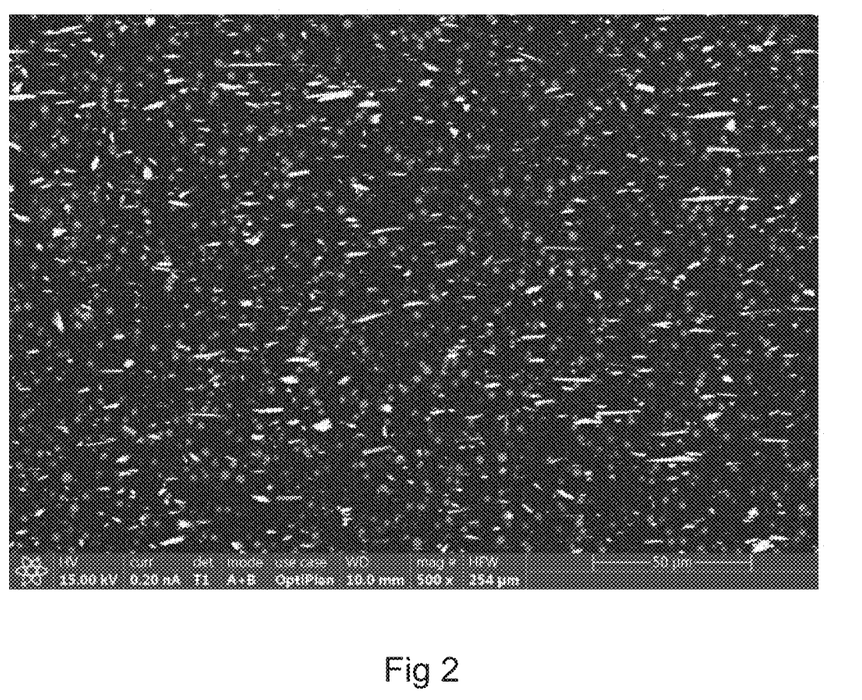
FIG. 2 is a 500× scanning electron micrograph of a cross section of an article of this invention.
Figure 3:
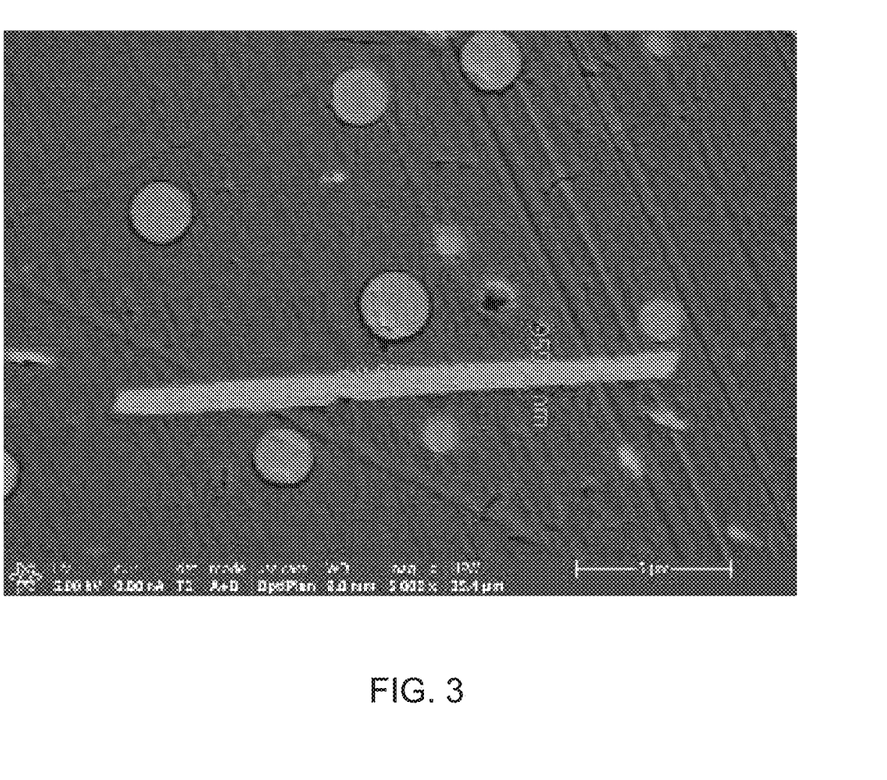
FIG. 3 is a 5000× scanning electron micrograph of a cross section of an article of this invention.

From the data and FIGS. 1A and 11B, which correspond to Comparative Example 1 and Example 2, it is readily apparent that the stress whitening is substantially improved while retaining the low gloss (matte) finish that is desired without loss of any significant desired mechanical properties. FIGS. 2 and 3 show the microstructure of Example 2 where it is readily evident that the PSQ particles have retained their spherical or round shape and both the PSQ particles and acicular particles are uniformly distributed within the article.

TABLE 1

| Ingredient | Wt % | Supplier | Comment |
|---|---|---|---|
| Optical Brightener | 0.2 | | UVITEX OB 2,5-thiophenediyl-bis(5-tert-butyl-1,3-benzoxazole |
| Pigment TiO$_2$ | 0.42 | | KRONOS 2230 |
| Dye Solvent Violet 13 | 0.002 | | |
| Anti-Oxidant Irgaphos P168 | 0.05 | BASF | Di-tertiary butyl phenyl phosphite |
| Anti-Oxidant Irganox 1076 | 0.1 | BASF | sterically hindered phenolic antioxidant |
| Mold Release PETS | 0.475 | EMERY | Penta-Erythritol-Tetra-Stearate |
| polysilsesquioxane ShinEtsu SR-0326 | 9.5 | Shinetsu Chemical Co. | D50 = 2 micron |
| CALIBRE PC 300-10 polycarbonate | 89.253 | Trinseo SA | Density = 1.2 g/cm3 MFR = 10 g/10' |

TABLE 2

| Ingredient | wt % | Supplier | Comment |
|---|---|---|---|
| Monosodiumphosphate anhydrous | 0.15 | | |
| CALIBRE PC300-10 polycarbonate | 78 | Trinseo SA | Density = 1.2 g/cm3 MFR = 10 g/10' |
| CALIBRE PC300-3 polycarbonate | 4.85 | Trinseo SA | Density = 1.2 g/cm3 MFR = 3 g/10' |
| CALIBRE PC-10 fines polycarbonate | 2 | Trinseo SA | Density = 1.2 g/cm3 MFR = 10 g/10' |
| Wollastonite Nygloss 4W10992 | 15 | Imerys | |

MFR = Melt Flow Rate (g/10 min)

TABLE 3

| Component | C. Ex. 1 | Ex. 1 | Ex. 2 | Ex. 3 | Ex. 4 | C. Ex. 2 |
|---|---|---|---|---|---|---|
| CALIBRE 200-10 polycarbonate | | | | | | 100 |
| Batch 1 | 100 | 75 | 50 | 25 | 0 | 0 |
| Batch 2 | 0 | 25 | 50 | 75 | 100 | 0 |
| % Wollastonite | 15 | 11.25 | 7.5 | 3.75 | 0 | 0 |
| % Shin-Etsu SR0326 | 0 | 2.38 | 4.75 | 7.13 | 9.5 | 0 |
| Ratio Wollastonite/SR0326 | | 4.73 | 1.58 | 0.53 | | |

TABLE 4

| Characteristic | Units | C. Ex. 1 | Ex. 1 | Ex. 2 | Ex. 3 | Ex. 4 | C. Ex. 2 |
|---|---|---|---|---|---|---|---|
| Average gloss | | 9.6 | 9.9 | 11.5 | 14.2 | 20.0 | >100 |
| Stress whitening visual from FDI test | NA | very high | high | medium | low | none | none |
| Notched Charpy @ 23° C. | kJ/m² | 9.5 | 12.1 | 15.4 | 19.9 | 36.1 | 72 |
| Falling Dart Impact (total energy) @ 23° C. | J | 43.1 | 44.6 | 47.9 | 53.8 | 59 | 73.8 |
| Falling Dart Impact (% ductile) | % | 50 | 60 | 70 | 90 | 100 | 100 |
| Elongation at rupture | % | 27.9 | | 53.8 | | | 102 |
| Elongation at yield | % | 4.6 | | 4.5 | | | 6.2 |
| Tensile modulus | MPa | 4509 | | 3304 | | | 2253 |
| Yield stress | MPa | 60.1 | | 54.1 | | | 61.2 |
| Rupture stress | MPa | 49.6 | | 47.3 | | | 63.1 |

FDI = Falling Dart Impact

What is claimed is:

1. A thermoplastic composition comprising a polycarbonate or polycarbonate copolymer; and at least 1% by weight of a polysilsesquioxane solid particles and an acicular filler, wherein the acicular filler and polysilsesquioxane particles are present in the composition at a mass ratio of acicular filler/polysilsesquioxane particles of 10 to 0.1.

2. The composition of claim 1, wherein the filler is comprised of calcium.

3. The composition of claim 1, wherein the acicular filler has an aspect ratio of at least 2 to 50.

4. The composition of claim 1, wherein the acicular filler has a median particle size (D50) of 0.1 micrometer to 25 micrometers and the polysilsesquioxane solid particles have a median particle size (D50) of 0.1 micrometer to 20 micrometers.

5. The composition of claim 1, wherein the polysilsesquioxane solid particles and acicular filler are present in the composition in an amount from 5% to 20% by weight of the composition.

6. The composition of claim 1, wherein the acicular filler and polysilsesquioxane solid particles are present in the composition at a mass ratio of filler/polysilsesquioxane solid particles of 5 to 0.1.

7. The composition of claim 1, wherein the polysilsesquioxane is crosslinked or has a 3D structure.

8. The composition of claim 7, wherein the polysilsesquioxane is formed from silesquioxane that is a siloxane of the formula $R(SiO_{3/2})n$ wherein n equals an even number higher than or equal to 4 to 16 and R is independently at each occurrence aryl, $C_1$ to $C_8$ alkyl, cycloalkyl, vinyl, or combinations of the same.

9. The composition of claim 7, wherein the polysilsesquioxane solid particles have an average sphericity of at least 0.9 as measured by image analysis on the projection of the particles from a micrograph.

10. An article comprised of the composition of claim 1.

11. The article of claim 10, wherein the article has a gloss of 20 or less measured according to ISO 2813 with a 60° angle of incidence from a sample made using a mirror finish tool.

12. A method of forming an article comprising,
(i) providing a composition comprised of a polycarbonate or polycarbonate copolymer; and at least 1% by weight of a polysilsesquioxane solid particles that have a decomposition temperature of at least 350° C. and an acicular filler, wherein the acicular filler and polysilsesquioxane particles are present in the composition at a mass ratio of acicular filler/polysilsesquioxane particles of 10 to 0.1,
(ii) heating the composition of step (i) to a temperature sufficient to melt the polycarbonate or copolymer of polycarbonate but insufficient to decompose the polysilsesquioxane solid particles, and
(iii) shaping the heated composition to form an article having the polysilsesquioxane solid particles and acicular filler dispersed therein.

13. The method of claim 12, wherein the polysilsesquioxane solid particles have an average sphericity of at least 0.9 within the article.

14. An article comprised of polycarbonate or polycarbonate copolymer having dispersed therein a filler having an aspect ratio of at least 2 to 50 and polysilsesquioxane solid particles having an average sphericity of at least 0.9, wherein the article has a gloss of 20 or less measured according to ISO 2813 with a 60° angle of incidence from a sample made using a mirror finish tool.

15. The article of claim 14, wherein filler and polysilsesquioxane solid particles are present in the composition at a mass ratio of filler/polysilsesquioxane solid particles of 10 to 0.1 and the filler is comprised of wollastonite.

* * * * *